Figure 1:
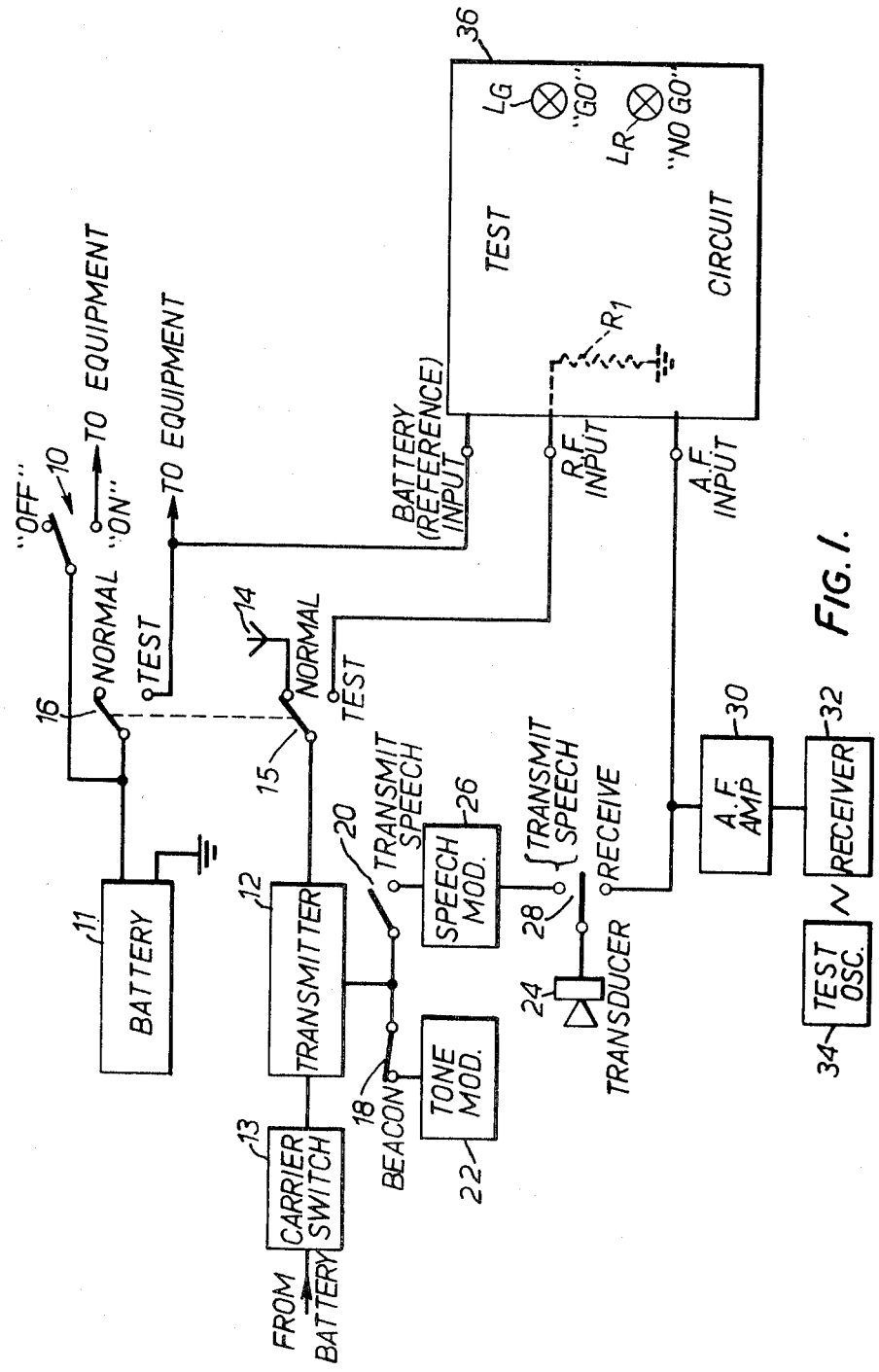

United States Patent
Pierce

[11] 3,737,782
[45] June 5, 1973

[54] RADIO TRANSMITTERS
[75] Inventor: Reginald Roy Pierce, Hartley, England
[73] Assignee: Burndept Electronics (E.R.) Limited, Kent, England
[22] Filed: July 13, 1971
[21] Appl. No.: 162,097

[30] Foreign Application Priority Data
July 16, 1970 Great Britain.....................34,551/70

[52] U.S. Cl................325/363, 325/133, 340/248 R, 340/249
[51] Int. Cl............................G08b 19/00, H04b 1/00
[58] Field of Search..............................325/133, 363; 340/248 R, 249

[56] References Cited
UNITED STATES PATENTS 3,697,876   10/1972   Robbins................................325/363
3,533,093   10/1970   Webb..............................340/248 R
3,600,234   8/1971    Massie.................................340/249
2,979,609   4/1961    Biagi...................................325/133
3,009,057   11/1961   Glaser.................................325/133
3,462,689   8/1969    Fenton................................325/363
3,201,776   8/1965    Morrow..........................340/248 R

*Primary Examiner*—Howard W. Britton
*Attorney*—Seidel, Gonda & Goldhammer

[57] ABSTRACT

The invention provides a self-test facility for such battery powered transmitter and transmitter/receiver apparatus as radio rescue beacons and includes a test circuit which can be switched to receive the output of the transmitter and give a PASS signal only if all the parameters under test, applied to gating networks, are correct. The circuit described is arranged to test the power output and modulation of the transmitter output the battery E.M.F. of a radio rescue beacon, and also the sensitivity and audio power output of the associated receiver.

9 Claims, 2 Drawing Figures

FIG. I.

RADIO TRANSMITTERS

The invention relates to radio transmitters and transmitter/receivers and is concerned with the provision of self-test facilities in small battery powered units.

The very nature of such radio transmitting and receiving equipment as emergency radio beacons requires them to be stowed in a non-operative condition for long periods of time with little or no occasion for their actual use. Therefore unlike most equipment in daily use, a random failure does not become apparent until the unit is required in an emergency.

To combat this undesirable state of affairs the answer is to provide a means of checking the beacon equipment at regular intervals. To date to do this and check the necessary number of functions to give a significant answer has required special external test equipment.

While this can do the necessary job there are three main disadvantages:

1. the complexity of the peripheral test unit deters the layman user;
2. if the peripheral equipment is simplified for the laymen it is unlikely to give sufficiently full and accurate information to be acceptable to radio servicing personnel; and
3. either method requires connection of the peripheral equipment to the beacon under test and this is not always very convenient, especially when the beacon is housed within the aircrew clothing for example.

A better solution is to provide a built-in test facility which is simple to interpret yet tests all the necessary parameters.

A simple indication is given by a two light system: for example RED for NO GO or FAIL and GREEN for GO or PASS.

The necessary parameters on a simple rescue beacon comprising essentially a modulated Radio Frequency (R.F.) transmitter speech transmission and reception facilities are as follows:

| Beacon | Power Output |
| --- | --- |
|  | Modulation |
|  | Carrier Switching |
| Battery | Correct E.M.F. |

The performance of the various parameter measurements and the provision of any extra stimuli should be automatic or part of the normal operating procedure for the equipment. In battery powered transmitter in accordance with the invention each of the three parameters under test is applied to a gating system which is used to give one signal (e.g. a GREEN LIGHT) if all parameters reach a prescribed minimum level and another (e.g. a RED LIGHT) if any parameter fails to reach that value.

In more elaborate rescue beacons and emergency equipment the further functions of speech transmission and reception may also be provided for. In such case it is described for the internal test facility to check the following additional parameters:

| Transmit Speech | Power Output |
| --- | --- |
|  | Audio Power Output |
|  | Modulation Capability by |
|  | external voice by microphone. |
| Receiver | Sensitivity |
|  | Audio Power Output |
|  | Transducer as Loudspeaker |

A specific application of the above principles will be explained by way of example, with reference to a specific instrument, viz. the Burndept Electronics Personal Survival Radio Type BE.375.

This beacon is a single-piece equipment designed to fit into a pocket of the survivor's lifejacket or in his survival pack. The facilities are "Automatic Beacon Signal" an optional speech transmission and reception on a frequency of 243 MHz and two way speech only on a frequency of 282.8 MHz. There is also an A F Modulated R.F. test oscillator the output of which can be coupled into the receiver.

Figure 2:
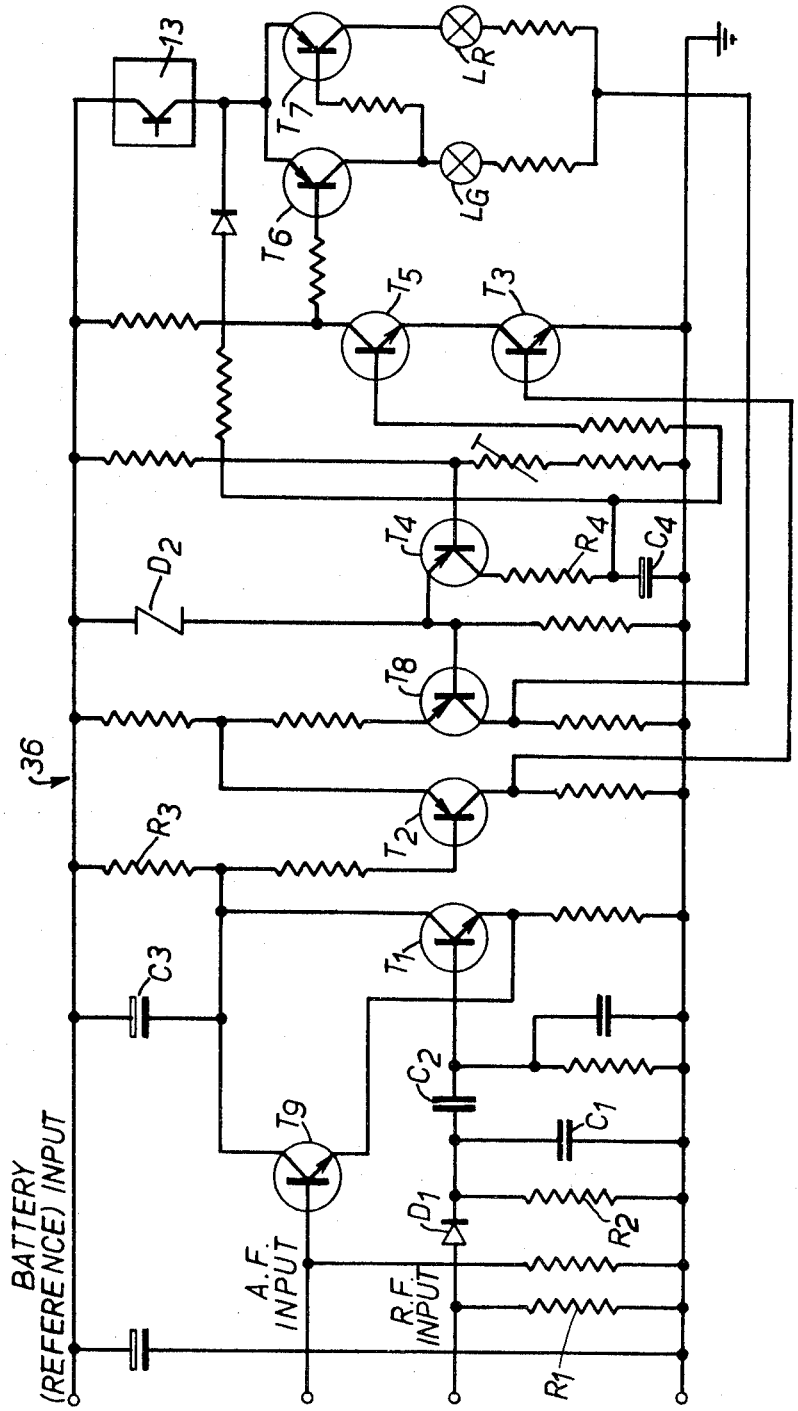

The accompanying drawings FIG. 1 is a block schematic diagram of the beacon equipment and the associated test facility in accordance with the invention; and FIG. 2 shows the test circuit.

The equipment is designed to be automatically switched on by closure of the ON - OFF switch 10 to connect the equipment to the Battery 11 during the Sea/Man separation phase of the ejection from an aircraft, Seat/Man is accomplished by withdrawing an activating pin (not shown) in the beacon, connected to the ejection seat by a nylon strap. The radio frequency (R.F) signal from the Transmitter 12 is coupled to the aerialsystem or systems 14 when the switch 15 is in its "normal" position.

To test the equipment a lever (not shown) externally located on the housing of the beacon is lifted thus operating two magnetic reed switches (the switch 15 and a switch 16 in FIG. 1) which simultaneously turn the equipment and the test circuit ON and in the "Test" position of the switch 15 connect the aerial feed from the aerial to a dummy resistance load R.1. in the test circuit.

With the exception of the aerial 15 being replaced by the dummy load R.1 and the normal ON/OFF switch 10 being in-operative the equipment in now able to function normally. In addition the various test circuits are switched into operation.

Having operated the test lever the test procedure for each function is as follows Beacon:— With the switch 18 closed and switch 20 open, the audio frequency (A.F) tone modulated output of the transmitter 12 is dissipated in the dummy load resistor R1. The radio frequency signal voltage across R1 is fed to diode D1 and network R2 C1 which acts as a detector and produces a Direct Current with an Audio Frequency (A.F) component related to the carrier power. The A.F. modulation applied from the tone modulator 22 on the carrier generated in the transmitter 12 is coupled through capacitor C2 to transistor T1 and integrated in the collector circuit by C3, R3. As C3 charges to the correct potential T2 is turned on which provides bias to turn on T3. However T3 has a further device T5 in its collector circuit acting as a further gate and only operated if the battery supply voltage at the Battery (Reference) Input of the circuit 36 is above the prescribed minimum value. This is ascertained by comparing a predetermined proportion of the normal "no load" voltage (i.e. the voltage seen during the period when the carrier is switched off) with the reference voltage derived from Zener Diode D2. If this is correct T4 will turn on charging C4 through R4 and turning T5 on. T5 will be held on by the charge on C4 during the periods when the battery is on load.

Thus with T3 on and T5 on, bias is available to turn on T6 which illuminates the green lamp LG. With T6 on, T7 is turned off thus turning off the red lamp LR. Therefore the conditions for a GO indication (GREEN LAMP) are:

a. A RF Power Output from the transmitter 12 greater than a set minimum;
b. A level of modulation from the carrier adequate to turn on T1; and
c. The correct E.M.F. from the battery 11.

If any of these conditions is not met than effectively one of the gates will not operate causing the redlamp LR to indicate NO GO.

T8 in conjunction with D2 provides a stabilized supply to the lamp circuit. The operation of the battery economizer by the carrier switching unit 13 is indicated by the GO lamp flashing ON and OFF in sympathy with the carrier switching rate.

Transmit Speech:— when the "transmit" button (not shown) is depressed to open switch 18 and close switch 20 the carrier power of transducer 24 is cut back to approximately 25 percent of the peak carrier power and there is no modulation. Thus the conditions applied to the test circuit are such that the red lamp is operated. However by whistling into the transducer 24 the carrier is upward modulated by the speech modulator 26 producing the correct input conditions to the test circuit 36, and causing the green lamp to illuminate. This procedure also checks the transducer as a microphone.

Receive. When the "receive" (not shown) is depressed, opening switch 20 and changing over switch 28 to connect the transducer 24 to A.F. amplifier 30 and receiver 32 the super-regenerative receiver 32 is brought into operation and the transmitter 12 turned off. Also the test oscillator 34 is brought into operation. This latter circuit is a self modulated free running RF oscillator at the appropriate receiver frequency. Output from this circuit is loosely coupled to the equipment receiver to provide a low level input. Due to the wide bandwidth of the superregenerative receiver and its inherent AGC characteristics the input signal level is not critical provided it is below the level which would permit random detection if the receiver was not operating in its superregenerative mode.

Thus the output from the test oscillator 34 produces a tone output from the receiver 32 if the latter operating correctly and this tone can be heard at the transducer 24 thus checking it as a load speaker. Also the A.F. output is fed to the test circuit, amplifier by the transistor T9 and applied to the emitter of T1 bypassing the RF detector, If the level is adequate then the green GO lamp will be illuminated.

It is preferable to use solid state lamps to provide the GO, NO GO information, low power consumption, effective light output and reliability being difficult to achieve with incandescent bulbs.

The facility is particularly valuable in the type of equipment described but is specially usefully applicable to any battery powered transmitter/receiver apparatus requiring a built in test facility.

I claim:

1. A battery powered radio apparatus provided with transmitter means and including a test circuit, said test circuit comprising: switch means to connect the output of said transmitter means to said test circuit; means for detecting the radio frequency power output of said transmitter means in excess of a first predetermined value; means for detecting modulation on the output of said transmitter means in excess of a second predetermined value; means for detecting the battery electromotive force in excess of a third predetermined value; and indicator means for producing a first signal only if said radio frequency power output detection means, said modulation detection means and said battery electro-motive force detection means detect values in excess of said first, second and third predetermined values, respectively, and produces a second signal otherwise.

2. A battery powered radio apparatus including a test circuit according to claim 1 wherein said radio frequency power output detection means includes a radio frequency detector network and a gating network, said gating network being switched from a normal stable state in response to a radio frequency power output from said transmitter means in excess of said first predetermined value being applied to said radio frequency detector network.

3. A battery powered radio apparatus including a test circuit according to claim 1 wherein said modulation detection means includes an audio frequency integrator and a gating network, said gating network being switched from a normal stable state in response to an audio frequency modulation signal from said transmitter means in excess of said second predetermined value.

4. A battery powered radio apparatus including a test circuit according to claim 1 wherein said battery electromotive force detection means includes a voltage comparator for comparing the voltage of said battery with a reference voltage equal to said third predetermined value, and a gating network, said gating network being switched from a normal stable state in response to the output of said voltage comparator when the voltage of said battery exceeds said predetermined value.

5. A battery powered radio apparatus including a test circuit according to claim 4 wherein said reference voltage is produced across a zener diode.

6. A battery powered radio apparatus including a test circuit according to claim 1 wherein said transmitter means is provided with a carrier switching means for switching the carrier of said transmitter means on and off, said indicator means producing said first signal in response to the carrier being switched on and producing said second signal in response to the carrier being switched off.

7. A battery powered radio apparatus including a test circuit according to claim 6 wherein the battery voltage is compared with said third predetermined value during the period when said carrier of said transmitter means is switched off.

8. A battery powered radio apparatus including a test circuit according to claim 1 and further including a receiver means, said transmitter and receiver means being provided with means for speech transmission and reception, respectively, said test circuit further including means for testing the sensitivity and audio output of said receiver means and means for testing the functioning of a transducer used as a microphone and loud speaker.

9. A battery powered radio apparatus according to claim 8 wherein said receiver sensitivity and audio power output testing means includes an audio frequency modulated radio frequency test oscillator loosely coupled to said receiver means, and switch means, said switch means energizing said test oscillator and coupling the audio frequency output of said receiver means to said modulation detection means.

* * * * *